(12) United States Patent
Calamvokis et al.

(10) Patent No.: US 6,272,614 B1
(45) Date of Patent: Aug. 7, 2001

(54) PROCESSING METHOD AND APPARATUS INVOLVING A PROCESSOR INSTRUCTION USING HASHING

(75) Inventors: Costas Calamvokis, Mountain View, CA (US); Aled Justin Edwards, Wotton-under-Edge (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/303,460

(22) Filed: Apr. 30, 1999

(30) Foreign Application Priority Data

May 1, 1998 (EP) .................................................. 98303431

(51) Int. Cl.[7] ...................................................... G06F 9/34
(52) U.S. Cl. ......................................... 711/216; 712/220
(58) Field of Search ............................. 711/216; 712/205, 712/220, 223, 225, 226; 707/103; 709/315

(56) References Cited

U.S. PATENT DOCUMENTS 5,333,283   7/1994   Emma et al. ......................... 712/236

FOREIGN PATENT DOCUMENTS

| | | |
|---|---|---|
| 0 387 008 | 9/1990 | (EP) . |
| 2 148 652A | 5/1985 | (GB) . |
| 2 307 065A | 5/1997 | (GB) . |

OTHER PUBLICATIONS

Raskovic et al: "An Implementation of Hash Based ATM Router Chip"—28th International Conference on System Sciences, vol. 1, Jan. 3–6, 1995, pp. 32–40 XP002079415 Wailea, HI US *p. 33 —p. 35, sections 3,4, figures 3*.

*Primary Examiner*—Do Hyun Yoo
*Assistant Examiner*—Gary J. Portka (57) ABSTRACT

A program-controlling processing unit executes instructions stored in memory. A special instruction type is provided for selectively retrieving an element from memory in dependence on the value of input data subject of the instruction. Each instruction of this type has a header identifying the instruction type, and a body in the form of a hash table having at least one entry with both (i) a check value corresponding to a value of interest of the input data subject of the instruction, and (ii) an element to be used when the input data has said value of interest. Upon execution of such an instruction, the related input data is hashed to produce an offset value that is used to access in memory, relative to the position in memory of the current instruction, a corresponding entry in the hash table of the instruction. If a "hit" results (that is, the check value of the accessed entry matches the input data value), the entry element is operatively output. Such a compact, relocatable, instruction is of particular use in processing units for controlling packet switches where the packet destination address is used to determine routing.

20 Claims, 8 Drawing Sheets

INSTRUCTION # 1

<0001>

| BRANCH (TABLE BODY) | |
|---|---|
| IN_SEL (PORT) IND_W=1 | |
| {2} <0009> | {0} EMPTY |
| {3} EMPTY | {1} <0005> |

INSTRUCTION # 2

<0005>

| BRANCH (TABLE BODY) | |
|---|---|
| IN_SEL (CALL <000F>) | |
| IND_W=1 | |
| {2} EMPTY | {0} EMPTY |
| {3} EMPTY | {1} [ACTION 1] |

INSTRUCTION # 3

<0009>

| BRANCH (TABLE BODY) | |
|---|---|
| IN_SEL (CALL <000F>) | |
| IND_W=1 | |
| {2} [ACTION 2] | {0} EMPTY |
| {3} EMPTY | {1} EMPTY |

INSTRUCTION # 4

<000F>

| BRANCH (HASH BODY) | |
|---|---|
| IN_SEL (DA) IND_W=2 | |
| {0} | EMPTY |
| {1} | EMPTY |
| {2} 0002 | 1 |
| {3} FFF1 | 2 |

PROCESSING METHOD AND APPARATUS INVOLVING A PROCESSOR INSTRUCTION USING HASHING

FIELD OF THE INVENTION

The present invention relates to a processing method and apparatus involving a processor instruction employing hashing.

BACKGROUND OF THE INVENTION

Processor instructions are known that provide for branching in dependence on the value of some parameter stored at a particular location (often in the accumulator of the processor ALU). Processor instructions are also known that provide for a degree of indirection in accessing an element to be handled by the instruction; by this is meant that the location of the target element is not directly specified in the instruction, but instead the instruction specifies a location that holds the address of the location storing the target element. More sophisticated indirection involves pre or post indexing based on a value held in a specific processor register (pre-indexing involves modifying the address specified in the instruction whereas post-indexing involves modifying the address stored in the location specified in the instruction).

In apparatus such as a packet switch, a controlling processor will generally be required to carry out some action based on the value of an input quantity such as a packet destination address. This desired capability can be viewed as a branching operation in which the processor must branch to a required action dependent on the value of the input quantity. Alternatively the desired capability can be likened to an operation involving indirection post-indexed by the value of the input quantity. However, in applications such as controlling a packet switch, the range of possible values of the input quantity may be very large even though only a very limited subset of these values may be of interest. The standard branch instructions or instructions involving indirection cannot cope with this requirement in a compact and simple manner and will generally use a number of memory locations corresponding to the number of possible values of the input quantity.

It is an object of the present invention to provide a compact and flexible way of controlling a processor to selectively access elements in dependence on the value of an input quantity.

As will become apparent below, the present invention achieves this object by employing hashing. Hashing is itself a well known technique by which a relatively long input is transformed into a shorter output. Hashing is used for many different purposes including memory look-up and for forming message authentication codes. A large number of different hashing functions are known.

Figure 1:
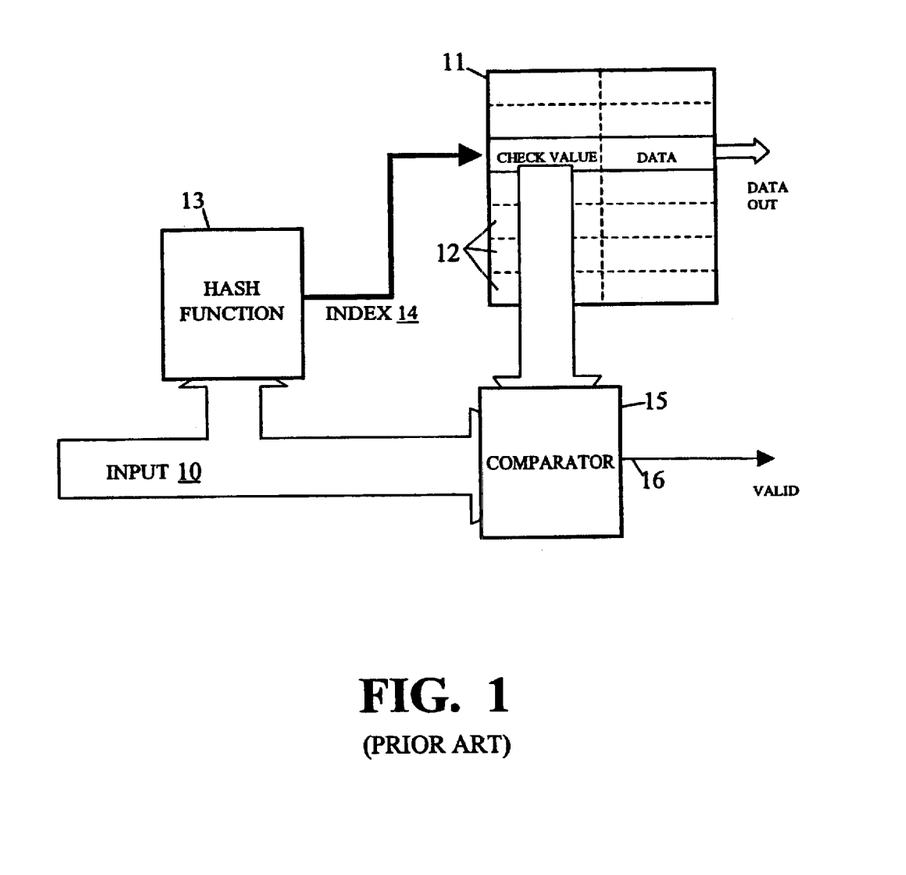
FIG. 1 is a diagram of a prior art memory look-up method using a hashing function.

In order to facilitate an understanding of the present invention, a brief description of hashing as applied to memory look-up will now be given with reference to FIG. 1 of the accompanying drawings. More particularly, in the FIG. 1 arrangement, an input 10 (for example, a 48-bit input) is to be used to retrieve data held in memory 11. In the current example, only a relatively small number of the possible values of the input 10 are of interest (for example, seven values). The memory is provided with a number of locations 12 equal, to or greater than, the number of input values of interest (but less than all possible input values), and the input 10 is applied to a hashing function 13 that transforms the input 10 into a shorter length index 14 matched to the size of the memory (in the current example, this might be a 3-bit index). The hashing function 14 is chosen such that every input value of interest produces a unique value of the index 14 and this latter value is then used to access a corresponding location of the memory 11—this location being that used to store the data that it is desired to associate with the input value concerned.

Of course, many values of the input 10 will give rise to the same index value but it is only desired to register a "hit" (a valid output of data from the memory 11) for the input value of interest that hashes to that index value. Accordingly, along with the data to be output, each memory location stores a check value corresponding to the input value for which that data is valid. When a memory location 12 is accessed, the check value is compared in comparator 15 with the current value of the input 10 and a data valid output 16 is only produced if there is a match. If the check value and input value do not match, a "miss" occurs. In so-called "perfect" hashing where every input value of interest is mapped by the hashing function 13 into its own unique value of index, this is the end of the process; however, it is often more efficient to practice "non-perfect" hashing in which there are some clashes between values of interest. In such cases, various strategies have been devised; for example, the indexed location may give access to a linked list of values of interest associated with that location. Another strategy is to effect "re-hashing" (that is, carrying out a hash retry) generally using a different hash function from that originally employed. Re-hashing strategies may extend to multiple re-hashing attempts each with a different predetermined hash function.

SUMMARY OF THE INVENTION

According to the present invention, there is provided a processing method in which program-controlled processing means, in the course of executing an instruction of a given type stored in memory, is caused to selectively retrieve an element from memory in dependence on the value of input data subject of the instruction; the instruction having a header identifying the instruction as of said given type, and a body in the form of a hash table having at least one entry with both (i) a check value corresponding to a value of interest of the input data subject of the instruction, and (ii) an element to be used when the input data has said value of interest; the method involving the steps:

(a) determining whether a current instruction to be executed by the processing means is of said given type;

(b) where step (a) determines that the instruction is of said given type, hashing the input data subject of the instruction to produce an offset value;

(c) using the offset value produced in step (b) to access in memory, relative to the position in memory of the current instruction, a corresponding entry in the hash table of the current instruction;

(d) comparing the value of the input data with the check value held in the entry accessed in step (c), and making available the associated entry element for operative use only when the compared values match.

In this manner, a compact instruction, relocatable in memory, is provided which is effective to produce different outcomes depending on the value of the input data subject of the instruction.

The element accessed in step (d) may be used by the processing means in several different ways. Thus, the element may be output as a control value and used, for example, for controlling packet routing in a packet switch.

Alternatively, the accessed element may be used as an indicator of the location of a next instruction to be executed by the processing means. A further use of the accessed element is as a return value that is returned to a prior instruction responsible for calling the instruction of said given type, the returned value being used, for example, as an index into a table associated with the prior instruction.

The source of the input data subject of the instruction may be implicit (for example, all such data may be provided at the same source as will generally be the case if the instruction is called by another instruction and the input data is passed as a calling parameter). Alternatively, the instruction header may include an input-selection parameter providing a source indicator for the input data (10). This source indicator may specify a memory/register location holding the input data and/or specific bits of interest of a wider input.

The header of the instruction may include a size parameter indicative of the size of the hash table contained in the body of the instruction, this size parameter being used to limit the size, and thus the value range, of the offset value produced in step (b) in order to match this value to the size of the hash table.

The hashing of the input data in step (b) may be carried out using a fixed hashing function. Preferably, however, the header of the instruction includes a hash control code, and the hashing of the input data is carried out in dependence on the value of this hash control code. Thus, in one embodiment, step (b) involves:

forming a transformed value by combining together at least portions of different versions of said input data, the hash control code serving to set specific parameters of this forming, and using the transformed value to provide the offset value.

Advantageously, the different versions of the input data are bit-shifted versions of the input data, the number of these different versions and their respective degrees of bit shifting being determined by the hash control code. The combining together of the said at least portions of the different input-data versions may be carried out using an exclusive-OR operation.

Hashing into the hash table need not be perfect and any suitable strategy, such as rehashing, may be adopted in cases where more than one input-data value of interest hashes to the same offset value.

According to another aspect of the present invention, there is provided apparatus having storage means storing a program including an instruction of a given type that comprises:

a header identifying the instruction as of said given type, and a body in the form of a hash table having at least one entry with both (i) a check value corresponding to a value of interest of input data subject of the instruction, and (ii) an element to be used by said instruction when said input data has said value of interest.

The apparatus may further comprise:

processing means for executing instructions stored in the storage means;

means for providing said input data;

hashing means for hashing the input data to produce an offset value, offset-access means for using the offset value to access the storage means at an offset relative to the location of a current instruction being executed by the processing means, and comparator means for comparing the input data value with the check value of a hash table entry accessed by the offset access means during the execution of an instruction of said given type by the processing means, the comparator means causing the output of the corresponding hash-table element when the value of the input data and the check value match.

Advantageously, the instruction of said given type includes a hash control code, and the hashing means comprises:

means operative upon said instruction being executed by the processing means to receive the input data and the hash control code, means for forming a transformed value by combining together at least corresponding portions of multiple bit-shifted versions of the input data, the number of such versions and their respective degrees of bit-shifting being determined by the hash control code, and means for using the transformed value to provide said offset value.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 2:
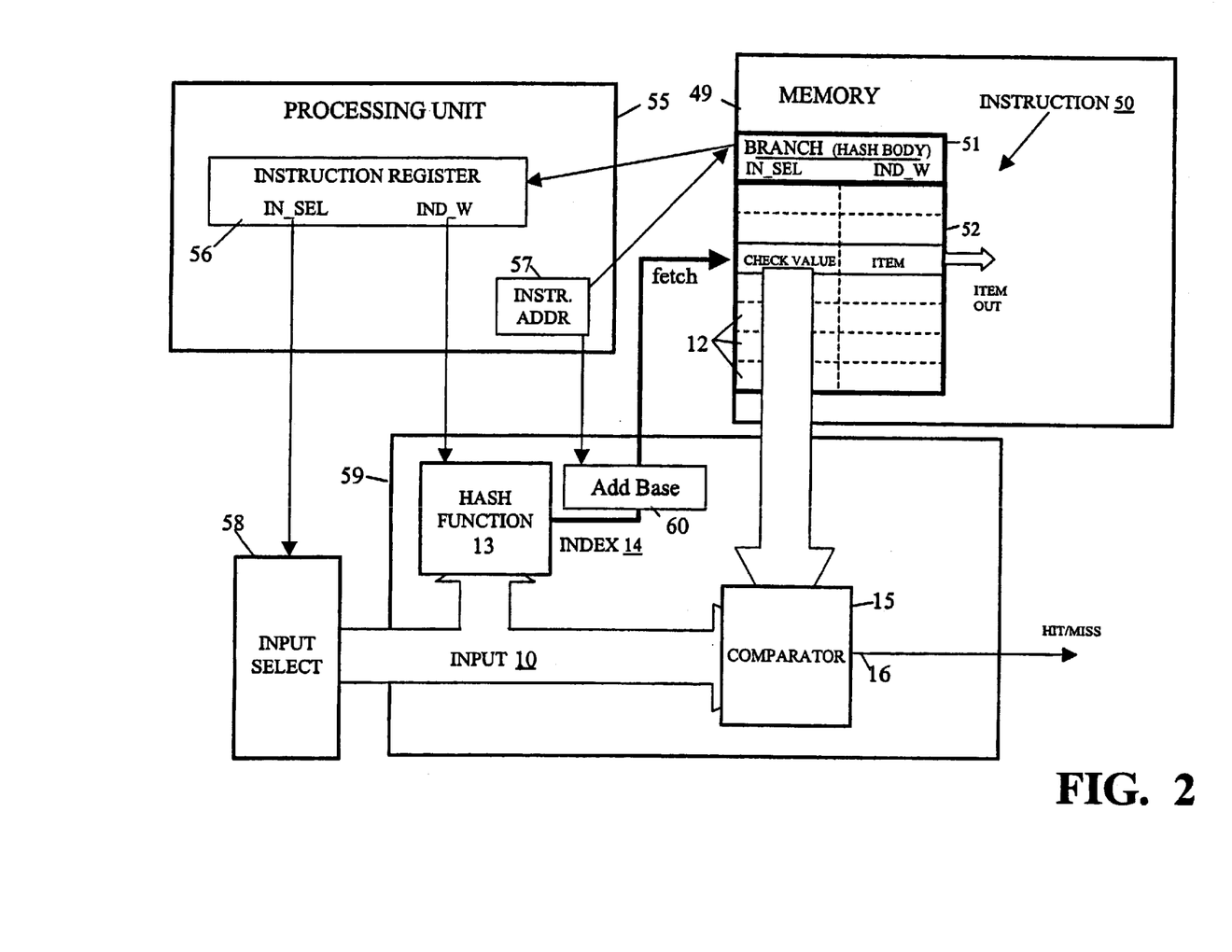
FIG. 2 is a diagram illustrating a processing system embodying the present invention.

FIG. 2 illustrates a processing system comprising a processing unit 55 arranged to execute instructions held in memory 49. These instructions include an instruction of a type intended to retrieve an element from memory in dependence on the value of an input 10 where only some of the input values are of interest—instruction 50 is an instruction of this type.

Instruction 50 includes an instruction header 51 identifying the instruction type (BRANCH (HASH BODY)), and an instruction body 52 in the form of a hash table formed by a set of check-value/element pairs corresponding to respective ones of the different input values of interest. These check-value/element pairs are held in the memory locations following the instruction header 51. Retrieval of the element corresponding to an input value of interest is achieved using hashing as will now be described.

The instruction header 51 is passed to an instruction register 56 of the processing unit 55 when the instruction is called by the unit (an instruction address register 57 in the unit 55 holds the address of the instruction to be fetched and executed). The instruction header serves to identify the instruction type to the processing unit 55. The instruction header 51 also includes a field IN_SEL that serves to specify the source of the input 10 and the contents of this field are passed from the instruction register 56 to an input selection unit 58 which fetches the desired input. The instruction header further includes a field specifying an index width (IND_W) which is passed to a hashing functional block 13. Block 13 generates an offset index 14 which is added in unit 60 to the base address represented by the address in memory of the instruction 50; the result is then used to access the corresponding memory location and retrieve the check-value/element pair held therein. If the retrieved check-value and current input value match, the corresponding element is output; otherwise a miss is reported. How the output element is used may be specified in the instruction header or it may be coded into the element itself; typically, the element will be an action to be executed, a return value, or a jump instruction to the processing unit 55.

The purpose of the index width parameter IND_W is to match the size of the index 14 (and thus the number of possible memory locations it can point to) to the size of the hash table body 51 of the corresponding instruction 50.

The block 13, the unit 60 and the comparator 15 may be considered as forming a hashing unit 59 of the FIG. 2 processing system.

Figure 3:
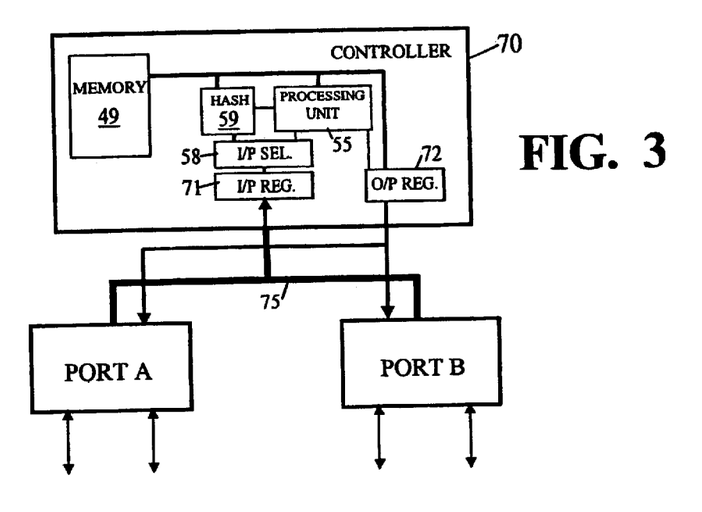
FIG. 3 is a diagram of a packet switch using a processing system of the FIG. 2 form to control packet routing.

FIG. 3 illustrates an application of the FIG. 2 processing system to the control of a packet switch; as will be appreciated by persons skilled in the art, the illustrated switch has been simplified, this being done to facilitate an understanding of the operation of the FIG. 2 processing system in the context of the switch. The switch has two ports A and B for receiving and sending packets. The ports are inter-connected by a bus 75 over which received packets can be passed between the ports. The bus 75 also connects to a controller 70. The role of the controller 70 is to route incoming packets received at the ports A and B by instructing each port as to which packets are to be output by that port. The controller makes its routing decision for a packet based on the packet destination address contained in the packet header (in the present example, this destination address is a 16 bit address), and a two-bit port identifier identifying the port on which the packet was received (for example, port A may be designated by a binary value of "01" and port B by a binary value of "10"). This information is made available to the controller 70 by arranging for each port to pre-append the corresponding port identifier to each packet header before putting the packet on the internal bus 75, the packet header and preappended port identifier then being received off the bus 75 by the controller and stored in an input register 71 (in practice, a queuing arrangement would be used). After the controller has made its routing decision, it places the result in an output register 72 from where it is passed to the ports to determine which port, if any, will output the packet.

In addition to the input and output registers 71, 72 the controller 70 comprises the FIG. 2 processing unit 55, instruction memory 49, hashing unit 59 and input select unit 58.

Figure 4:
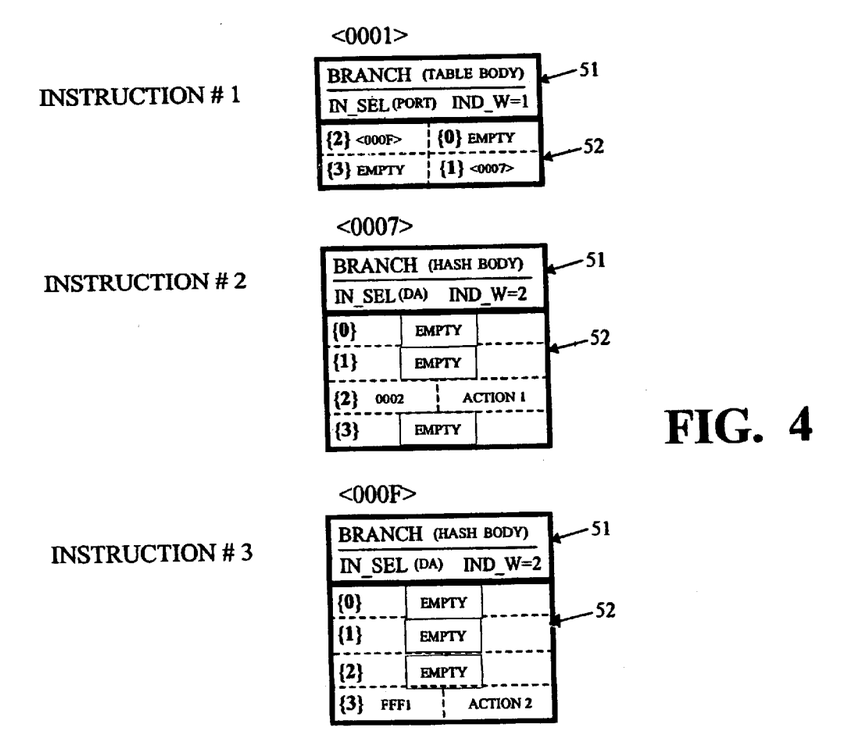
FIG. 4 is a diagram illustrating a sequence of three instructions, including two branch instructions with hash-table bodies, for execution by the FIG. 2 processing system in effecting operation in accordance with the present invention.

Operation of the controller will first be considered in respect of the sequence of three instructions shown in FIG. 4, these instructions being held in memory 49. All three instructions have an instruction header and an instruction body; however, only the second and third instructions are of the BRANCH (HASH BODY) type described above. The first instruction is also BRANCH instruction but its body contains a simple lookup table indexed into directly by the value of the input quantity specified by an IN_SEL parameter contained in the instruction header; this instruction is designated as being of a type BRANCH (TABLE BODY). The header of the first instruction also contains the IND_W parameter that has the same function as for the BRANCH (HASH BODY) instruction 50.

Figure 5:
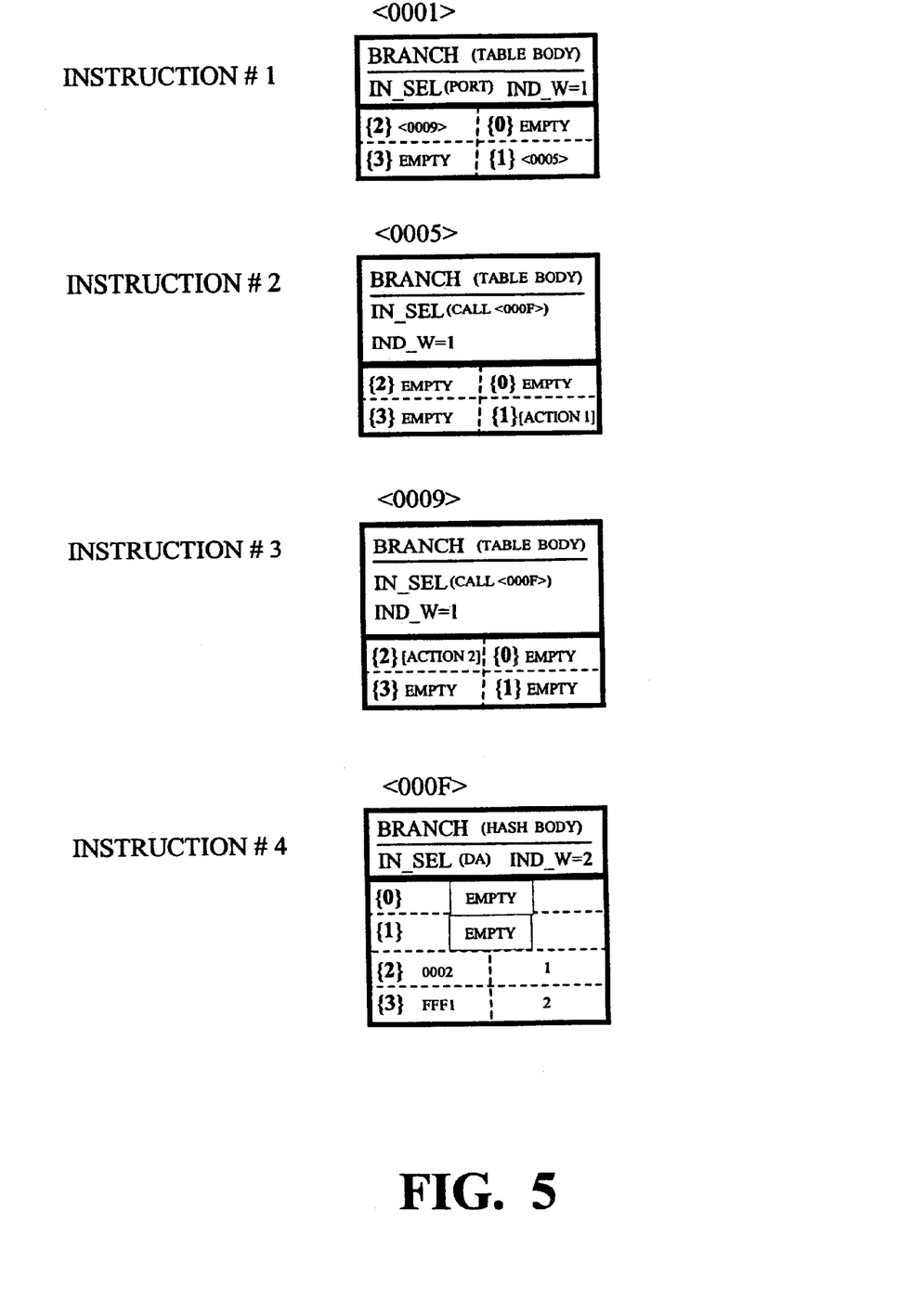
FIG. 5 is a diagram illustrating a sequence of four instructions, including a called branch instruction with a hash-table body, for execution by the FIG. 2 processing system in effecting operation in accordance with the present invention.

The first instruction is used to look at the two port-identifier bits of the packet information held in input register 71 (IN_SEL parameter set to PORT). In the present case, the port identifier will have a value of "1" or "2" and results in a corresponding one of the instruction-body memory locations being accessed. Because the port-identifier is two bits, the instruction-body table is sized to store four outcomes at corresponding locations {0} to {3} although only two are actually required in the present example. In fact, because in the present case each memory word can hold two outcomes, only two memory words are used for the four possible outcomes (thus the parameter IND_W only has a value of one, indicating a table size of two memory words). It should also be noted that the numbers given in the instruction examples of FIGS. 4 and 5 are in hexadecimal notation.

The outcomes stored in the body of the first instruction indicate which of the second and third instructions should now be executed. More particularly, if the port identifier has a value of "1" then the accessed outcome will be the address <0007> of the second instruction, whereas if the port identifier has a value "2" the accessed outcome will be the address<000F> of the third instruction. The processing unit 55 takes the accessed address and retrieves the corresponding instruction.

The jumped-to one of the second and third instructions, then looks at the sixteen destination address bits held in register 71 (IN_SEL set to DA) and hashes them (using hashing unit 59) to provide an offset index for accessing into the hash table body. In the present example, there are only two destination addresses of interest, namely the address <0002> for packets received on port A and the address <FFF1> for packets received on port B. The size of the hash table is here four words (IND_W=2), each word holding one hash table entry. A hash-table "hit" results in the output of a port action instruction (ACTION 1 or ACTION 2 in the current example) which is stored under the control of the processing unit 55 in the output register 72 to determine routing of the packet. If no "hit" is achieved, the output register is not set and the packet is not forwarded.

The instruction sequence of FIG. 4 uses a respective hash table for each port. Whilst the BRANCH (HASH BODY) is a compact way of handling the large range of potential destination address values, where the number of addresses of interest is large (thousands rather than the two of the FIG. 4 example), it is preferable to list the addresses only once, that is, to have only one BRANCH (HASH BODY) instruction rather than two. This can be achieved by treating the instruction as a called function that returns a lookup table index as will now be described with reference to the instruction sequence of FIG. 5.

In the FIG. 5 instruction sequence, the first instruction is the same as in the FIG. 4 sequence, namely a BRANCH (TABLE BODY) instruction that looks at the port identifier bits and executes a jump to the second or third instruction in dependence on the value of the port identifier. The second and third instructions are also BRANCH (TABLE BODY) instructions—these instructions contain the specific actions to be posted to the output register 72 for the specific destination addresses of interest for packets received at ports A and B respectively. The index into the table body of each of the second and third instructions is provided by the input source indicated by the IN_SEL parameter. In this case the IN_SEL parameter is set to CALL <000F> for both instructions to indicate that the index to be used is the value returned from calling the instruction located at address <000F>. This called instruction (the fourth instruction of FIG. 5) is a BRANCH (HASH BODY) instruction that hashes the destination address bits to provide an offset into its hash table body. The hash table body contains the return values to be returned to the calling instruction. Using the same two destination addresses of interest as in the FIG. 4 example, the address <0002> results in a value of "1" being returned whilst the address value <FFF1> results in the value "2" being returned. A hash table "miss" will result in a null value being returned. As can be seen from a study of FIG. 5, if the calling instruction was the second instruction (port A the receiving port), only a return value of "1" results in the output of an action (ACTION 1); similarly, if the calling instruction was the third instruction (port B the receiving port), only a return value of "2" results in the output of an action (ACTION 2).

The process of suspending the operation of the calling instruction whilst the called instruction is executed is effected in standard manner using a stack onto which and from which appropriate parameters of operation are pushed and popped.

Figure 6:
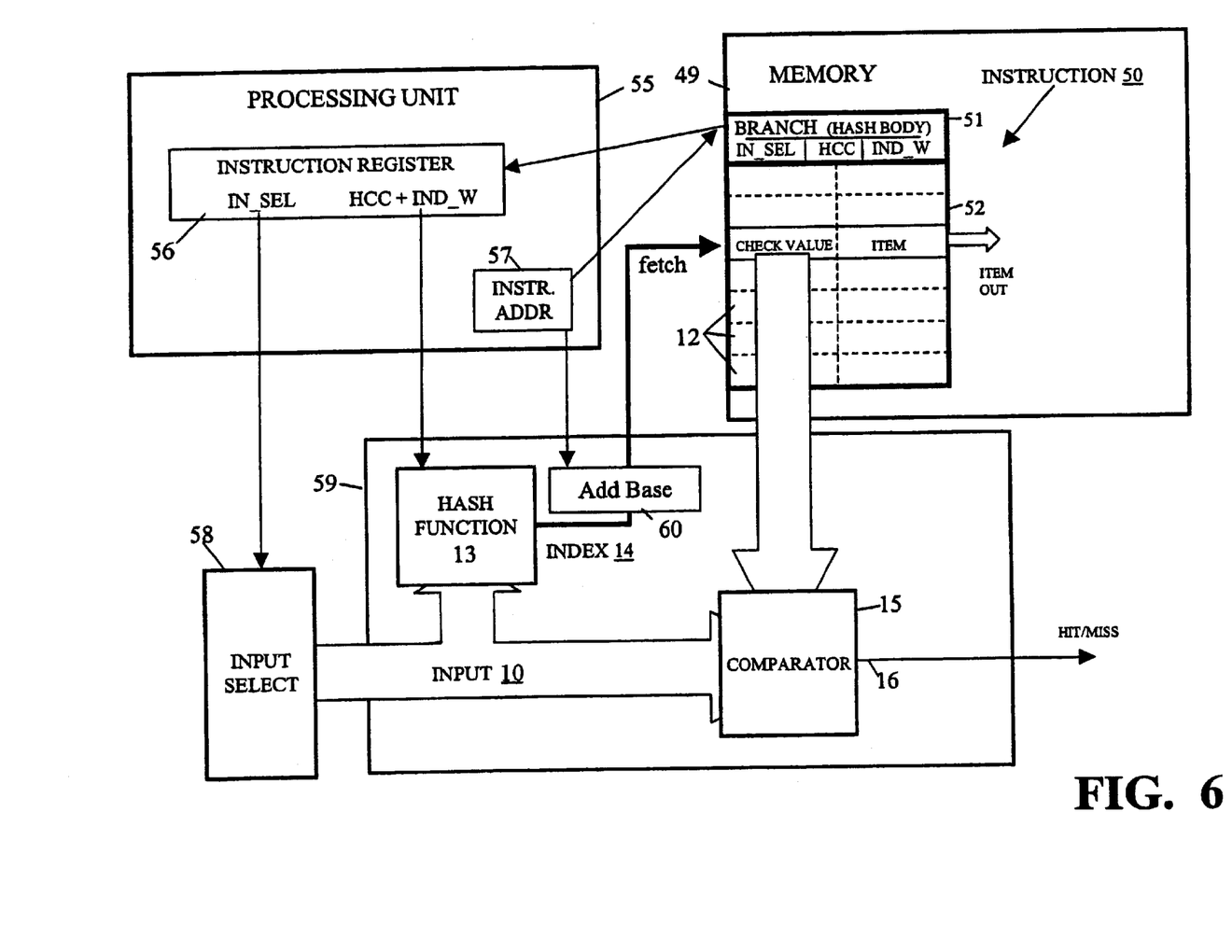
FIG. 6 is a diagram illustrating a second form of processing system embodying the present invention, this second form being similar to that shown in FIG. 2 but with a controllable hashing functional block.

FIG. 6 illustrates a variant on the FIG. 2 form of processing system in which the hash function used by the hashing functional block 13 is controlled by a hash control code (HCC) 20 included in the header 51 of each branch instruction whose body is in the form of a hash table. Upon such an instruction 50 being loaded into the processing unit 55 from memory 49, the hash code is passed to the block 13 to determine parameters of the hash function to be used for hashing the input data subject of the instruction. Because the hashing function can be controlled, it can be adapted to suit different search space problems (that is, to suit situations that differ one from another in terms of the characteristics of the input relative to the number and identity of the input values of interest), the index 14 produced by block 13 being applied to an appropriately-sized memory space relevant to the current input.

Figure 7:
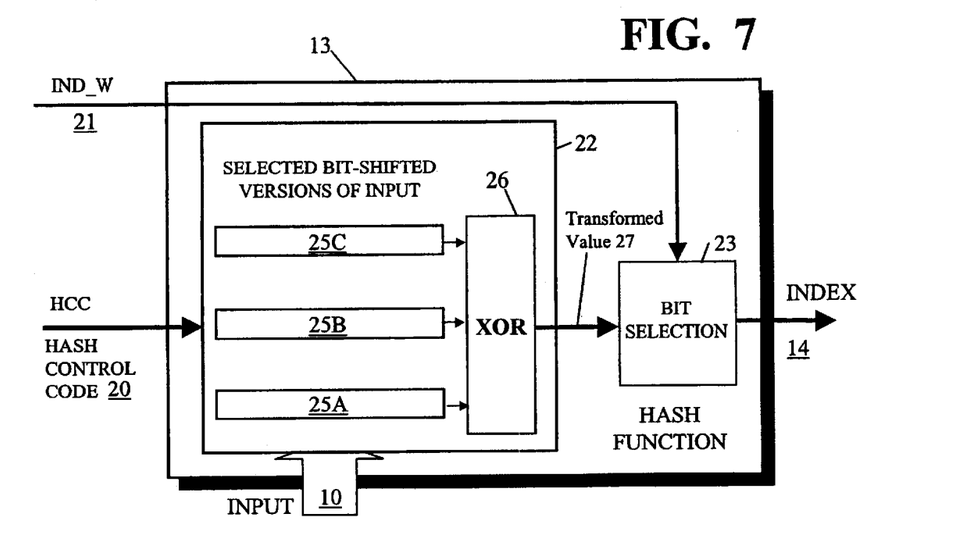
FIG. 7 is a diagram illustrating a preferred form of the controllable hashing functional block of FIG. 6.

FIG. 7 illustrates the principle of operation of one form of the block 13 suitable for use in the FIG. 6 system. The FIG. 7 block 13 comprises a combining block 22 and a bit selection block 23. The combining block 22 serves to form an intermediate value 27 (termed a "transformed value" below) by combining together, in exclusive-OR block 26, different bit-shifted versions 25A, 25B and 25C of the input 10; the number and degree of bit shifting of these input versions 25 is determined by the hash control code 20. The bit-selection block then forms the index 14 by selecting bits from the transformed value 27, the number of these bits being determined by an index-width parameter 21 (which effectively specifies the size of the memory space to be accessed by index 14).

Figure 8:
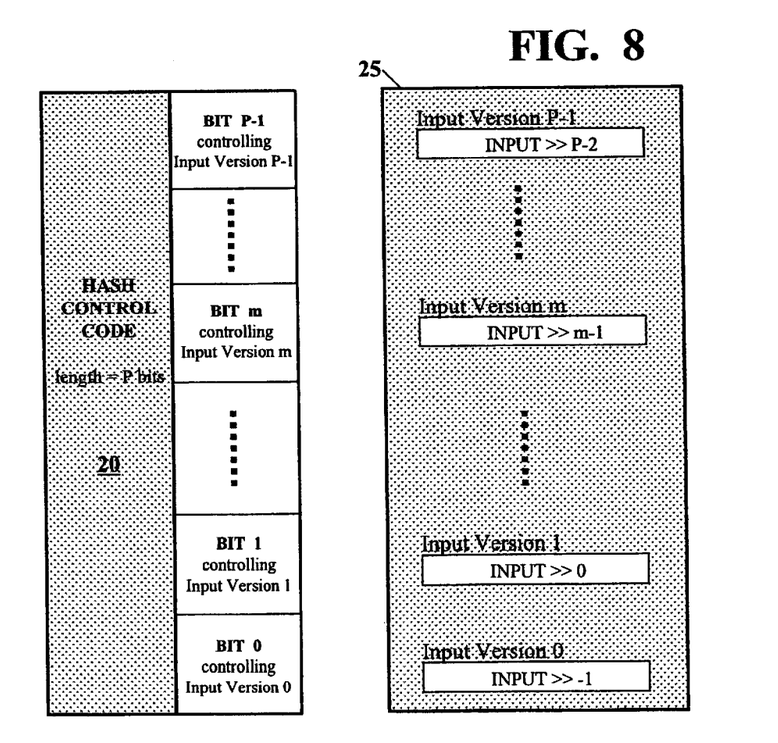
FIG. 8 is a diagram showing a hash control code supplied to the FIG. 7 hashing functional block.

How the hash control code 20 is used to control which input versions are combined together is diagrammatically depicted in FIG. 8. The combining block 22 has the potential to create (at least notionally, if not explicitly) P bit-shifted versions of the input, these versions being labelled Version 0 to Version (P−1) in FIG. 8. These versions are progressively further bit shifted right by increments of one bit from Version 0 to Version (P−1) with Version 0 being right shifted (−1) relative to the original input 10 (that is, left-shifted by 1). In the present example, the input is shifted and not circulated to form the input Versions 0 to (P−1) with zero values being added to fill otherwise undefined bit positions outside of the input sequence.

The hash control code 20 has P bits extending from bit position 0 to position P−1. If the code 20 has a "1" in a particular bit position, then the corresponding input version is presented to XOR block 26 for combination with other versions so presented. For example, if bit positions 2, 7 and 9 of the code 20 are "1"s and all other positions "0", then input Versions 2, 7 and 9 (corresponding to right shifts of 1 bit, 6 bits and 8 bits respectively), are combined in the XOR block 26 to form the intermediate transformed value 27.

Figure 9:
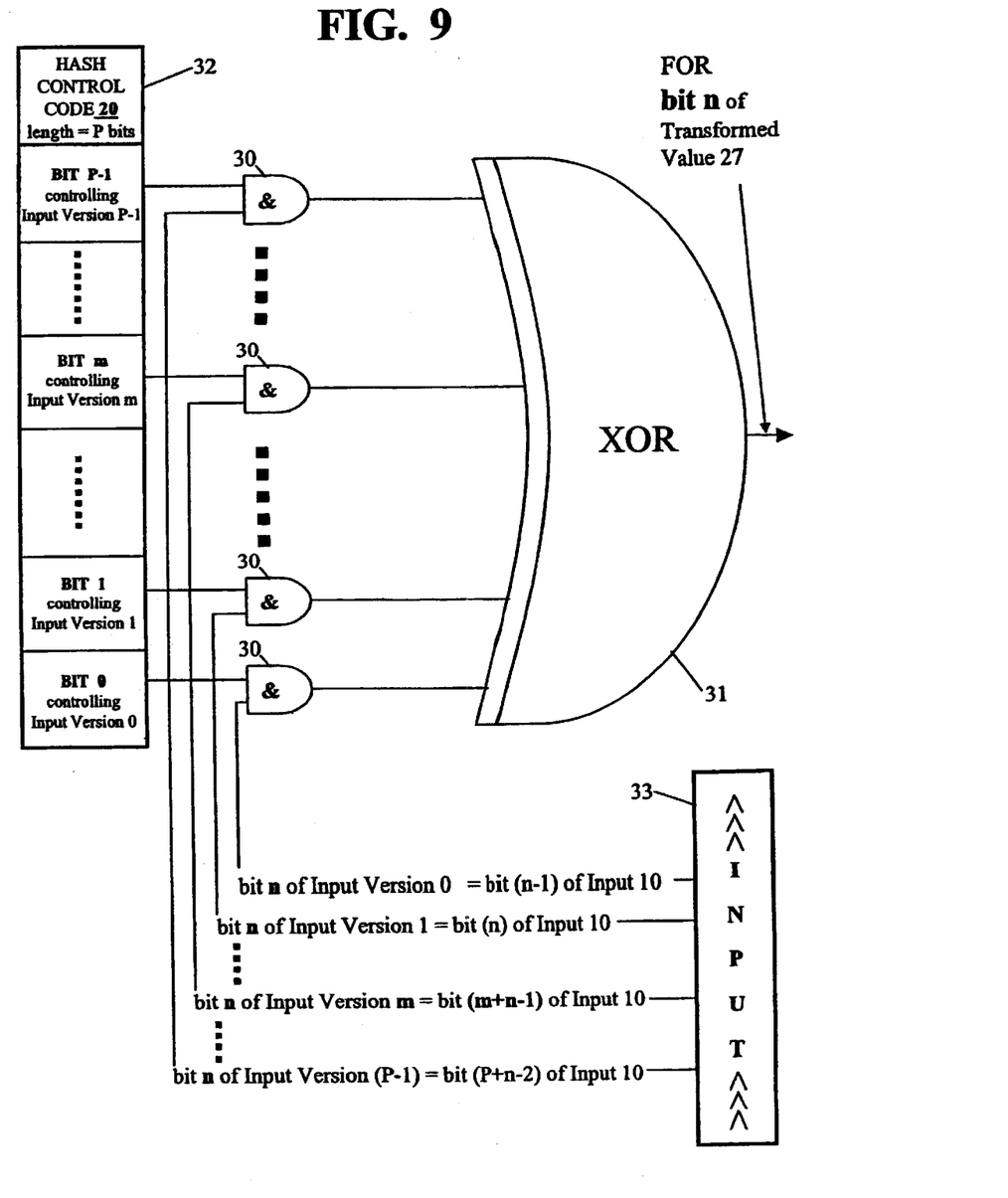
FIG. 9 is a block circuit diagram showing the derivation of one bit of a transformed value formed by the FIG. 7 hashing functional block.

FIG. 9 illustrates circuitry for effecting version selection and combination for generating one bit (the bit in bit position "n") of the transformed value 27. More particularly, the hash control code is held in register 32 and each bit is used to control a corresponding two-input AND gate 30; the outputs of all the gates 30 are fed to an XOR gate 31. The other input of each gate 30 receives bit "n" of the input Version that corresponds to the hash control code bit controlling that gate (bit 0 being the first bit position in each version). These bit "n" values for all input versions can be simply derived by tapping appropriate cells of a register 33 that holds the input 10 padded each end with zero bits. Thus bit "n" of input version "m" is bit (m+n−1) of input 10.

As is apparent, only the bit "n" s of the input versions enabled by the corresponding bits of the hash control code 32 will be passed to the XOR gate 31. This gate produces a "1" output when supplied with an odd number of "1"s, and a "0" output otherwise.

The FIG. 9 circuitry, other than registers 32, 33, is repeated for each bit of the transformed value (which may, for example, be a 16-bit value).

With regard to the bit-selection block 23, in the present example this takes bit 1 to bit (index-width) of the transformed value, and outputs them as the index 14. More complex selection patterns may alternatively be used. Suitable circuitry for implementing block 23 will be apparent to persons skilled in the art.

By way of example, a hash control code of 'h1dbb764747a (where 'h indicates hexadecimal notation) and an index width of 3 will discriminate between the following six 48-bit input values:

'h080009732b60
    'h080009732d68
    'h080009732fd8
    'h080009732de8
    'h080009732cf8
    'h0800097329d8

From the foregoing, it will be seen that the hash control code provides a convenient and flexible way of providing a very large number of different hash functions. Determination of the hash control code needed to produce the hash function best suited for a particular purpose (for example, for achieving perfect hashing within the minimum memory space) can be determined by an automated trial and error process. Once the desired hash control code has been determined, then it can be applied to the hashing functional block 13 whenever a relevant input 10 is received. At the same time, the appropriate index width input 23 is also provided.

In fact, trial and error determination of a suitable hash control code could potentially take a long time and it is therefore convenient to take steps to improve the chances of success if trial and error does not produce a successful result after a given number of tries. In particular, the size of the index width can be increased to give a larger target (the penalty being that more memory will be required). Another approach is to allow re-hashing—that is, not always to seek to achieve perfect hashing but to allow for input values of interest to hash to the same index (and thus memory location) with only one of these values being validated—any non-validated accesses to a memory location giving rise to a re-hash using a different hash function.

Figure 10:
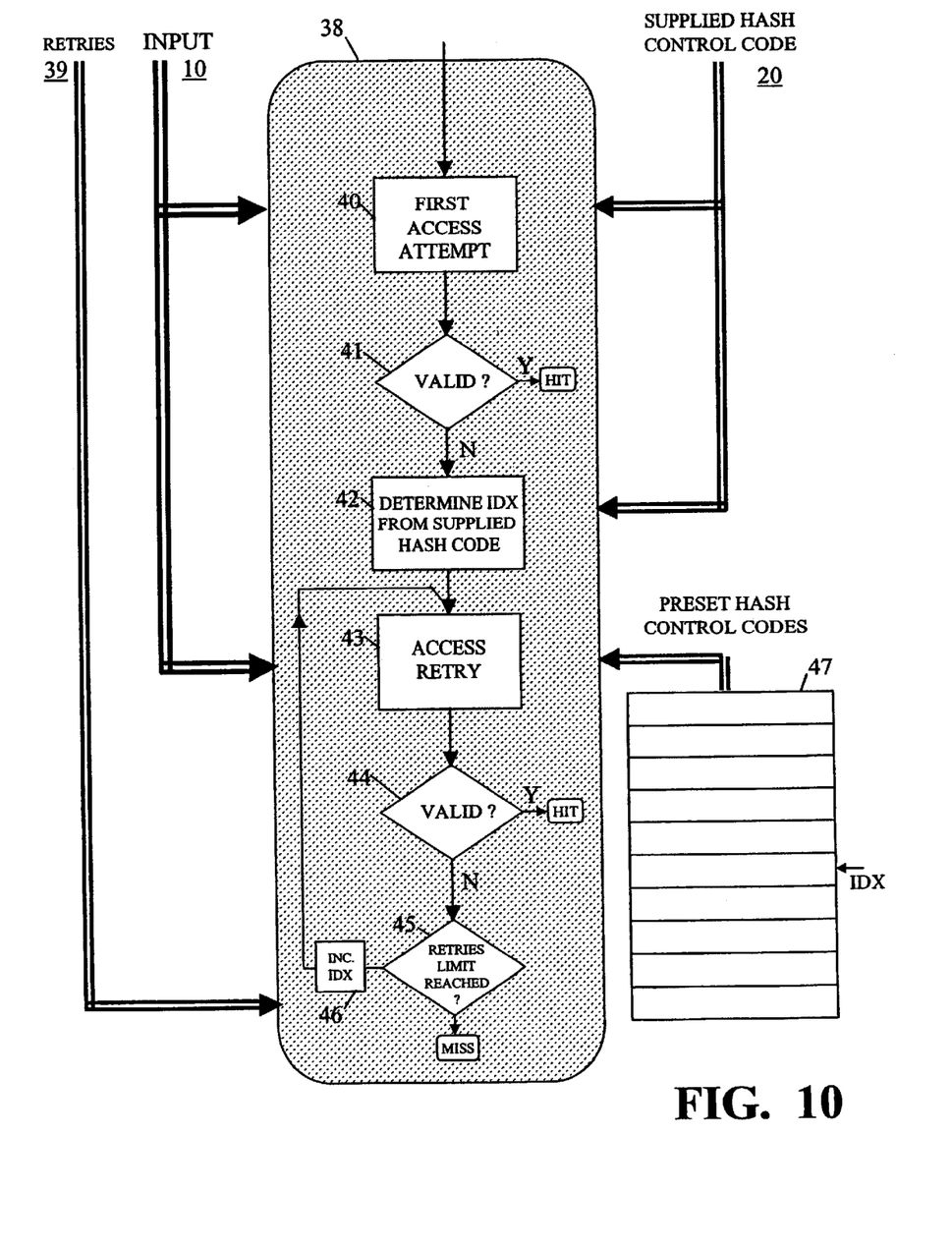
FIG. 10 is a flow chart showing a hashing method that involves carrying out retries in the event of a non-validated memory access.

This approach is illustrated in FIG. 10 where steps 40 to 46 within box 38 represent the overall hashing process. More particularly, at step 40 a first memory access attempt is made on the input 10 using the supplied hash control code 20 (and index width, this latter not being illustrated as it is constant for the whole hashing process). At step 41, the validity of the memory access attempt is checked by comparing the input 10 with the check value stored in the accessed location; if validated (a "hit") the hashing process is exited. However, if a "hit" is not achieved, a new memory access attempt is made using a hash control code selected from a set 47 of predetermined codes; the identity of the chosen code is given by determining (step 42) the value of an index idx into the set 47 on the basis of the terminating bits of the supplied hash control code 20. Using the selected predetermined hash control code, a new access attempt is made (step 43) and its validity is checked (step 44). If a "hit" is achieved, the hashing process is exited; otherwise, the value of idx is incremented (step 46) and a further retry is made with the new predetermined hash control code pointed to by idx. The number of retries permitted is limited by a retry value 39, the current number of retries being tested against this value 39 in step 45 (it being understood that a count is kept of the number of retries). If a "hit" is not achieved after the maximum number of retries permitted, a "miss" is output to indicate that the input value was not one of interest, and the hashing process exited. It will be appreciated that the initial hash control code 20, the index width and the number of permitted retries are chosen to ensure that all input values of interest will result in a "hit").

A number of variants are, of course, possible to the described embodiments of the invention. For example, the source of input data for the BRANCH (HASH BODY) instruction may be implicit rather than explicitly specified by the IN-SEL parameter. Furthermore, whilst the hash control code of FIGS. 6 to 10 has been described as controlling the number and degree of bit-shifting of the input versions 25, additional or different parameters of the hashing function could be controlled. Thus, the hashing control code could include bits for specifying the function used to combine the input versions (multiplication of the versions, etc), and/or for specifying circulation rather than shifting of the input, and/or for specifying the direction and magnitude of shifting/circulation between versions, and/or the ordering of the bits selected by bit-selection block 23, etc. Additionally, at least the bit selection function of the bit-selection block 23 can be implemented within the FIG. 4 form of the combining unit 22 by disabling those instances of the gating circuitry (elements 30, 31) related to bits of the transformed value that are not required for the current index.

With respect to FIG. 10, rather than the control codes used for hash retries being selected from a predetermined set of codes (47), each hash code could be computed from the current one using some kind of XORing function.

What is claimed is:

1. A processing method in which program-controlled processing means, in the course of executing an instruction of a given type stored in memory, is caused to selectively retrieve an element from memory in dependence on the value of input data subject of the instruction; said instruction having a header identifying the instruction as of said given type, and a body in the form of a hash table having at least one entry with both (i) a check value corresponding to a value of interest of said input data subject of the instruction, and (ii) an element to be used when said input data has said value of interest; said method involving the steps:

(a) determining whether a current instruction to be executed by the processing means is of said given type;

(b) where step (a) determines that the instruction is of said given type, hashing the said input data subject of the instruction to produce an offset value;

(c) using the offset value produced in step (b) to access in memory, relative to the position in memory of the current instruction, a corresponding entry in the hash table of the current instruction;

(d) comparing the value of the input data with the check value held in the entry accessed in step (c), and making available the associated entry element for operative use only when the compared values match.

2. A method according to claim 1, further involving using a said element made available in step (d), for controlling packet routing in a packet switch.

3. A method according to claim 1, further involving using a said element made available in step (d), as an indicator of the location of a next instruction to be executed by the processing means.

4. A method according to claim 1, further involving using a said element made available in step (d), as a return value that is returned to a prior instruction responsible for calling the instruction of said given type.

5. A method according to claim 4, wherein said return value is used by said prior instruction as an index into a table associated with said prior instruction.

6. A method according to claim 1, wherein the header of said instruction includes an input-selection parameter providing a source indicator for said input data, said method involving using the input-selection parameter to access the input data to be hashed in step (b).

7. A method according to claim 1, wherein the header of said instruction includes a size parameter indicative of the size of the hash table contained in the body of the instruction, said method involving using the size parameter to limit the size, and thus the value range, of said offset value to match the size of the hash table.

8. A method according to claim 1, wherein the hashing of the input data in step (b) is carried out using a fixed hashing function.

9. A method according to claim 1, wherein the header of said instruction includes a hash control code, and the hashing of the input data in step (b) is carried out in dependence on the value of said hash control code.

10. A method according to claim 9, wherein step (b) involves:

forming a transformed value by combining together at least portions of different versions of said input data, the hash control code serving to set specific parameters of this forming, and using said transformed value to provide said offset value.

11. A method according to claim 10, wherein said different versions of the input data are bit-shifted versions of the input data, the number of said different versions and their respective degrees of bit shifting being determined by said hash control code.

12. A method according to claim 11, wherein said hash control code is a multi-bit code, the state of each of at least some of the bits of the hash control code determining the presence or absence of a said version of the input data that corresponds to the bit shifting of the input data by an amount dependent on the position of the relevant hashing control-code bit in that code.

13. A method according to claim 1, wherein said at least portions of different versions of said input data are combined by an exclusive-OR operation.

14. A method according to claim 1, wherein in cases where using an initial hash function to effect the hashing of step (b) results in more than one value of interest of said input data hashing to the same offset value, then in the event of the corresponding hash-table entry containing a check value that does not match with the input data value in step (d), at least one further hash attempt is made using a different hash function from said initial hash function.

15. Apparatus provided with comprising processing means for executing a program that includes an instruction having a header and a body, the header identifying it as of a given type, and the body being in the form of a hash table having at least one entry with both a check value and an output element; the processing means having for processing an instruction of said given type:

hashing means for hashing an input data value to produce an offset value;

offset-access means for using said offset value to access an entry of the instruction's hash table at an offset relative to the instruction header;

and comparator means for outputting the element of the accessed hashtable entry when the letter's check value matches the input data value.

16. Apparatus according to claim 15, wherein the instruction of said given type includes a hash control code, said hashing means comprising:

means operative upon said instruction being executed by the processing means to receive said input data and said hash control code, means for forming a transformed value by combining together at least corresponding portions of multiple bit-shifted versions of said input data, the number of such versions and their respective degrees of bit-shifting being determined by said hash control code, and means for using said transformed value to provide said offset value.

17. Apparatus according to claim 16, wherein said different versions of the input data are bit-shifted versions of the input data, the number of said different versions and their respective degrees of bit shifting being determined by said hash control code, said means for forming a transformed value comprising:

first register means for storing said input data, the first register means being accessible over its length so as to permit access to said versions by appropriately offset access into the first register means;

second register means for storing said hash control code;

exclusive-OR means; and gate means connected to said first and second register means for controlling the passing to said exclusive-OR means of bits of said different versions of the input in dependence on the value of the hash control code, the output of said exclusive-OR means constituting said transformed value.

18. Apparatus comprising a processor for executing a program that includes an instruction having a header and a body, the header identifying it as of a given type, and the body being in the form of a hash table having at least one entry with both a check value and an output element; the processor having, for processing an instruction of said given type:

hashing apparatus for hashing an input data value to produce an offset value;

offset-access apparatus for using said offset value to access an entry of the instruction's hash table at an offset relative to the instruction header; and a comparator for outputting the element of the accessed hash-table entry when the latter's check value matches the input data value.

19. Apparatus according to claim 18, wherein the instruction of said given type includes a hash control code, said hashing apparatus comprising:

an input operative upon said instruction being executed by the processor to receive said input data and said hash control code;

a combining unit for forming a transformed value by combining together at least corresponding portions of multiple bit-shifted versions of said input data, the number of such versions and their respective degrees of bit-shifting being determined by said hash control code; and provisioning circuitry for using said transformed value to provide said offset value.

20. Apparatus according to claim 19, wherein said different versions of the input data are bit-shifted versions of the input data, the number of said different versions and their respective degrees of bit shifting being determined by said hash control code, said combining unit comprising:

a first register for storing said input data, the first register being accessible over its length so as to permit access to said versions by appropriately offset access into the first register;

a second register for storing said hash control code;

an exclusive-OR unit; and a gating unit connected to said first and second registers for controlling the passing to said exclusive-OR unit of bits of said different versions of the input in dependence on the value of the hash control code, the output of said exclusive-OR unit constituting said transformed value.

* * * * *

UNITED STATES PATENT AND TRADEMARK OFFICE
CERTIFICATE OF CORRECTION

PATENT NO. : 6,272,614 B1 Page 1 of 1
APPLICATION NO. : 09/303460
DATED : August 7, 2001
INVENTOR(S) : Costas Calamvokis et al.

It is certified that error appears in the above-identified patent and that said Letters Patent is hereby corrected as shown below:

Claim 15, Column 11, line 37, delete "letter's" and insert therefor --latter's--

Signed and Sealed this

Twenty-first Day of October, 2008

JON W. DUDAS
*Director of the United States Patent and Trademark Office*